(12) United States Patent
Storozuk

(10) Patent No.: US 10,800,507 B2
(45) Date of Patent: Oct. 13, 2020

(54) PANEL FOR A VEHICLE AND METHOD OF MANUFACTURING A PANEL

(71) Applicant: THE BOEING COMPANY, Chicago, IL (US)

(72) Inventor: Marc Storozuk, Winnipeg (CA)

(73) Assignee: THE BOEING COMPANY, Chicago, IL (US)

( * ) Notice: Subject to any disclaimer, the term of this patent is extended or adjusted under 35 U.S.C. 154(b) by 719 days.

(21) Appl. No.: 15/628,092

(22) Filed: Jun. 20, 2017

(65) Prior Publication Data

US 2018/0362135 A1      Dec. 20, 2018

(51) Int. Cl.
| B64C 1/12 | (2006.01) |
| B64C 1/06 | (2006.01) |
| B64C 1/38 | (2006.01) |
| B64C 1/00 | (2006.01) |

(52) U.S. Cl.
CPC ............ B64C 1/12 (2013.01); B64C 1/069 (2013.01); B64C 1/38 (2013.01); B64C 1/061 (2013.01); *B64C 2001/0045* (2013.01); *B64C 2001/0072* (2013.01)

(58) Field of Classification Search
CPC .. B64C 1/12; B64C 1/069; B64C 1/38; B64C 1/061
See application file for complete search history.

(56) References Cited

U.S. PATENT DOCUMENTS

| 3,014,564 A * | 12/1961 | Thomsen ............... E04B 9/345 |
| | | 52/126.5 |
| 3,785,098 A * | 1/1974 | Schweitzer ............ H02B 15/04 |
| | | 52/663 |
| 4,828,202 A | 5/1989 | Jacobs et al. |
| 4,885,889 A * | 12/1989 | Hemphill .................. E04B 9/04 |
| | | 52/506.06 |
| 4,905,437 A * | 3/1990 | Heather ............ E04F 15/02447 |
| | | 52/220.3 |
| 5,226,626 A * | 7/1993 | Driscoll ............... E04B 9/0428 |
| | | 248/343 |
| 6,370,831 B1 * | 4/2002 | Marshall ........... E04F 15/02405 |
| | | 52/126.1 |
| 6,508,037 B1 * | 1/2003 | Owen .................... H02G 3/285 |
| | | 52/126.4 |
| 6,766,984 B1 | 7/2004 | Ochoa |
| 7,713,732 B1 * | 5/2010 | Hallsten ................ C05F 17/964 |
| | | 435/299.1 |
| 9,126,670 B2 | 9/2015 | Thable et al. |
| 9,994,375 B2 * | 6/2018 | Zacchi ............... B65D 71/0096 |
| 10,196,825 B2 * | 2/2019 | Gosling ............ E04F 15/02494 |
| 2002/0157339 A1 * | 10/2002 | Repasky ............... E04D 11/005 |
| | | 52/506.06 |

(Continued)

*Primary Examiner* — Justin M Benedik
(74) *Attorney, Agent, or Firm* — Moore IP Law

(57) ABSTRACT

A panel for a vehicle and a method for manufacturing the panel are provided. One panel has two sides forming a corner having a profile that is substantially non-orthogonal and a substructure is provided having a protrusion extending from a body of the substructure towards a surface of the panel. The protrusion has a profile extending along an edge thereof that substantially matches the profile of the corner of the panel such that the protrusion and the corner of the panel form a gap therebetween when the panel is mounted to the substructure.

20 Claims, 10 Drawing Sheets

(56) References Cited

U.S. PATENT DOCUMENTS

| | | | | |
|---|---|---|---|---|
| 2010/0224729 A1* | 9/2010 | Lieven | ................. | B64C 1/1492 |
| | | | | 244/129.3 |
| 2013/0082143 A1* | 4/2013 | Storozuk | ............... | B64C 1/1446 |
| | | | | 244/129.5 |
| 2013/0084422 A1* | 4/2013 | Thable | ................... | B64C 1/069 |
| | | | | 428/137 |

* cited by examiner

US 10,800,507 B2

1

PANEL FOR A VEHICLE AND METHOD OF MANUFACTURING A PANEL

BACKGROUND

The present disclosure relates in general to exterior panels for vehicles, such as aircraft exterior panels.

Aircraft can include exterior panels that form the outer surface of at least part of the aircraft fuselage. These aircraft exterior panels (also referred to as skin panels) traditionally have a rectangular shape with 90 degree corners. The corners traditionally abut against the corners of other panels. The corners are often sharp. These sharp corners on the aircraft exterior panels are more susceptible to damage than the remainder of the panel edges when not fastened to the aircraft, typically during handling and transport. When damaged, the panel may have to discarded and replaced, or the damaged panel repaired, in order to be able to be properly installed in connection with other exterior panels on the aircraft. The sharp corners also generate stress concentrations.

Accordingly, for these panels with sharp corners, protection from damage when not on the airplane is provided, typically by placing a protective cover over the corner (e.g., Styrofoam, cardboard, etc.). This extra protection adds cost and is still not always completely effective in protecting the corners, which depends on the diligence of the individual to apply and maintain the cover. Additionally, at some point, the protective cover has to be removed for installation onto the airplane, thereby adding time to the installation process.

Thus, in conventional exterior panel designs, the corners are susceptible to damage even with the addition of protective covers.

SUMMARY

In one embodiment, a panel arrangement for a vehicle is provided. The panel arrangement includes a panel having two sides forming a corner having a profile that is substantially non-orthogonal and a substructure having a protrusion extending from a body of the substructure towards a surface of the panel. The protrusion has a profile extending along an edge thereof that substantially matches the profile of the corner of the panel such that the protrusion and the corner of the panel form a gap therebetween when the panel is mounted to the substructure.

In another embodiment, a skin panel is provided that includes a body having at least two sides that extend to a non-orthogonal corner. The non-orthogonal corner has a profile that is shaped complementary to a portion of a substructure to which the body is to be mounted.

In another embodiment, a method of manufacturing a panel for a vehicle is provided. The method includes forming at least one non-orthogonal corner on a panel during a manufacturing process of the panel. The method further includes configuring the panel for mounting to a substructure of a vehicle having a protrusion with a complementary feature to the non-orthogonal corner, such that the non-orthogonal corner is positioned adjacent to the complementary feature to define a gap therebetween.

2

Figure 1:
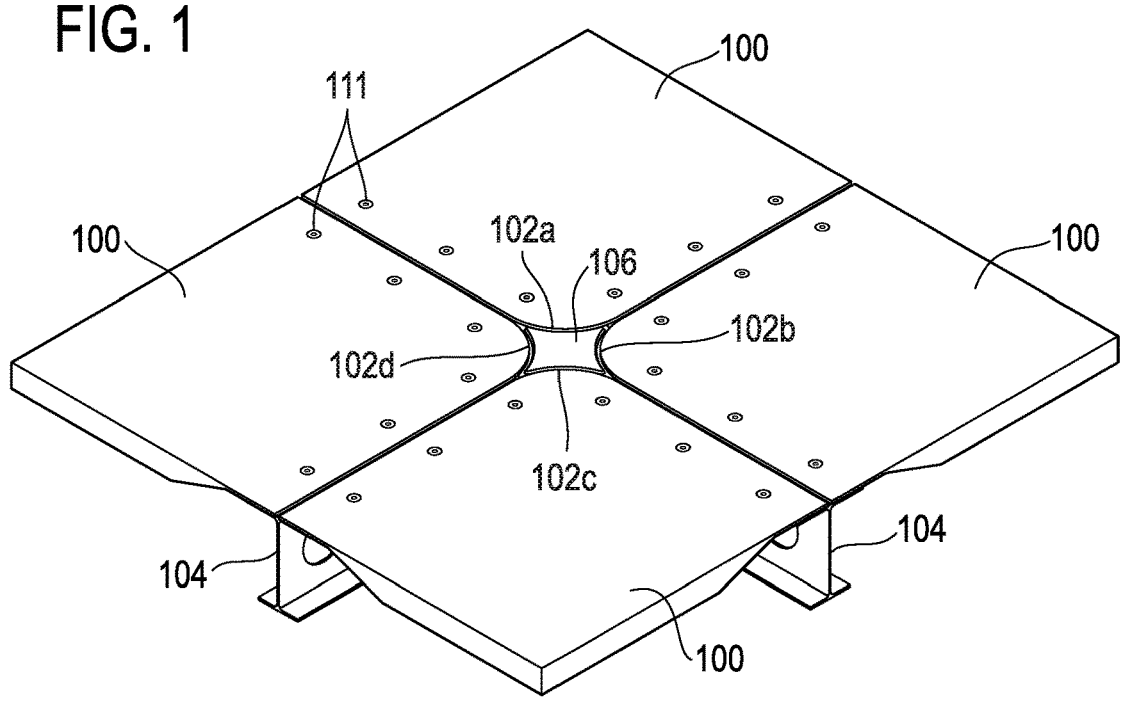
FIG. 1 illustrates a top perspective view of vehicle panels in accordance with an embodiment.
Figure 2:
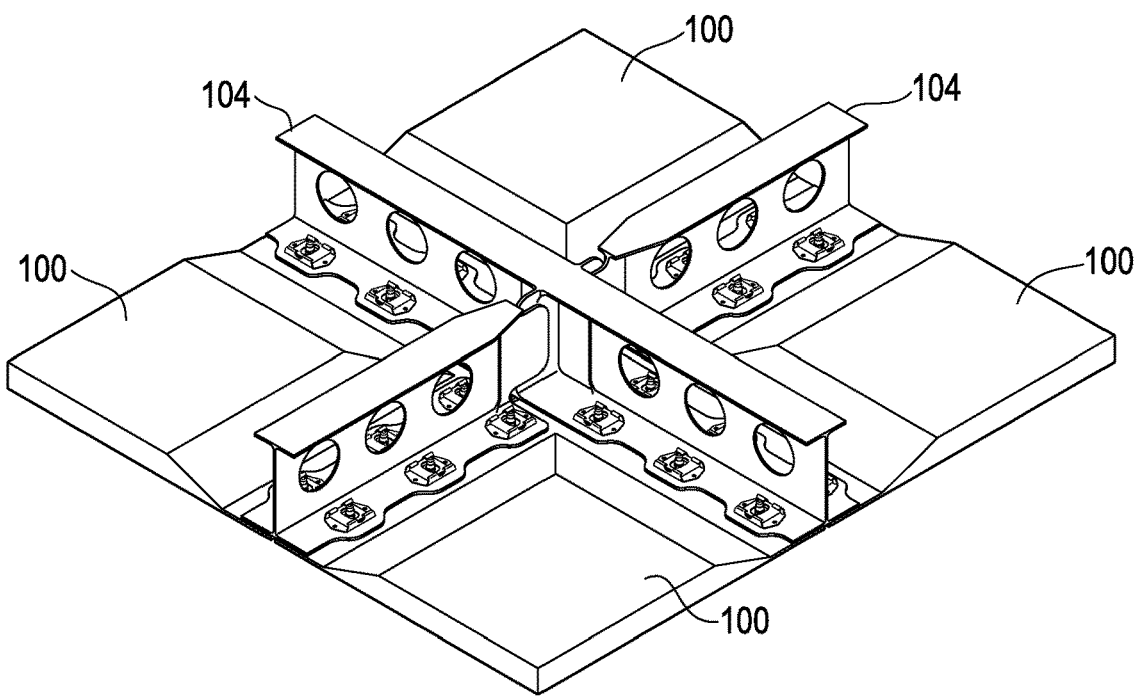
FIG. 2 illustrates a bottom perspective view of the vehicle panels of FIG. 1.
Figure 3:
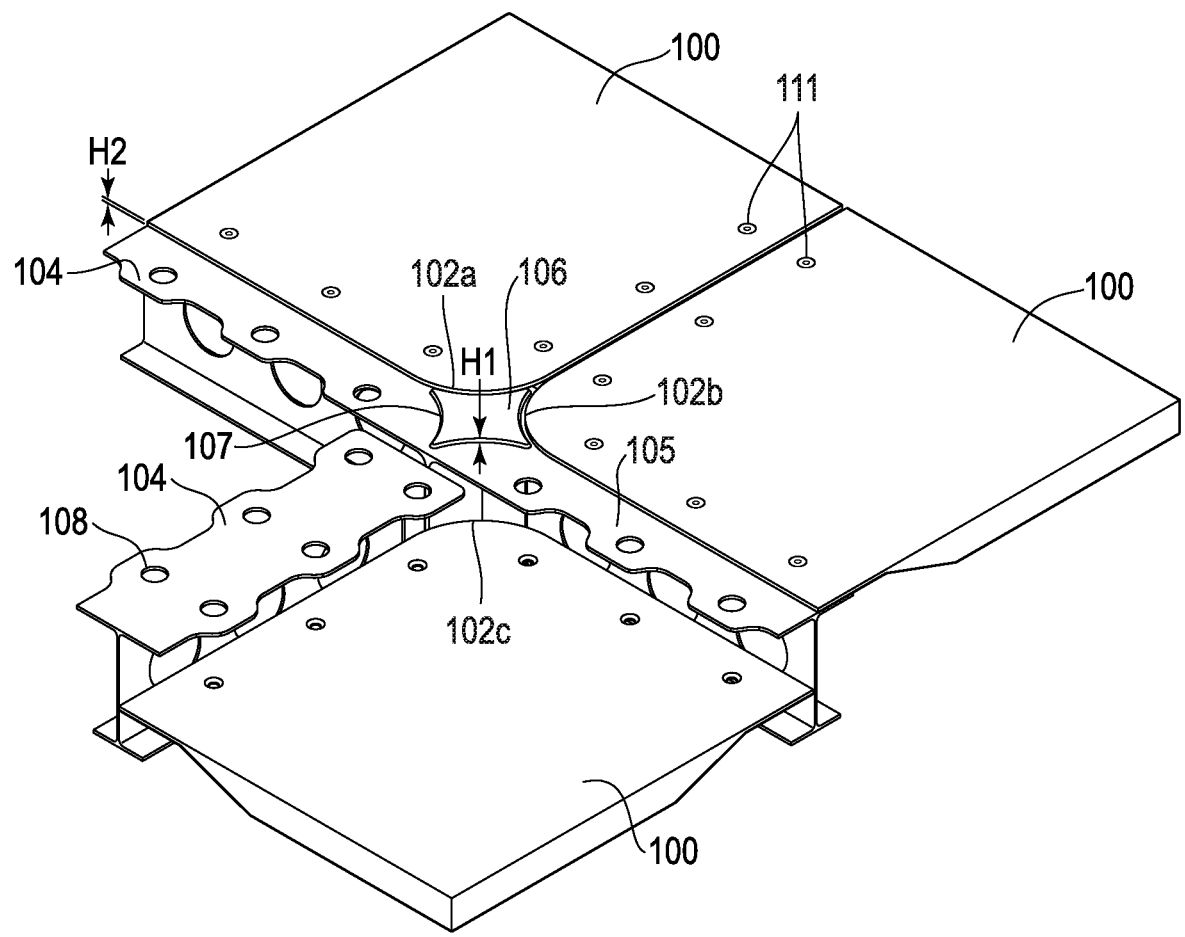

FIG. 3 illustrates a top perspective view of the vehicle panels of FIG. 1 with panels removed.

Figure 4:
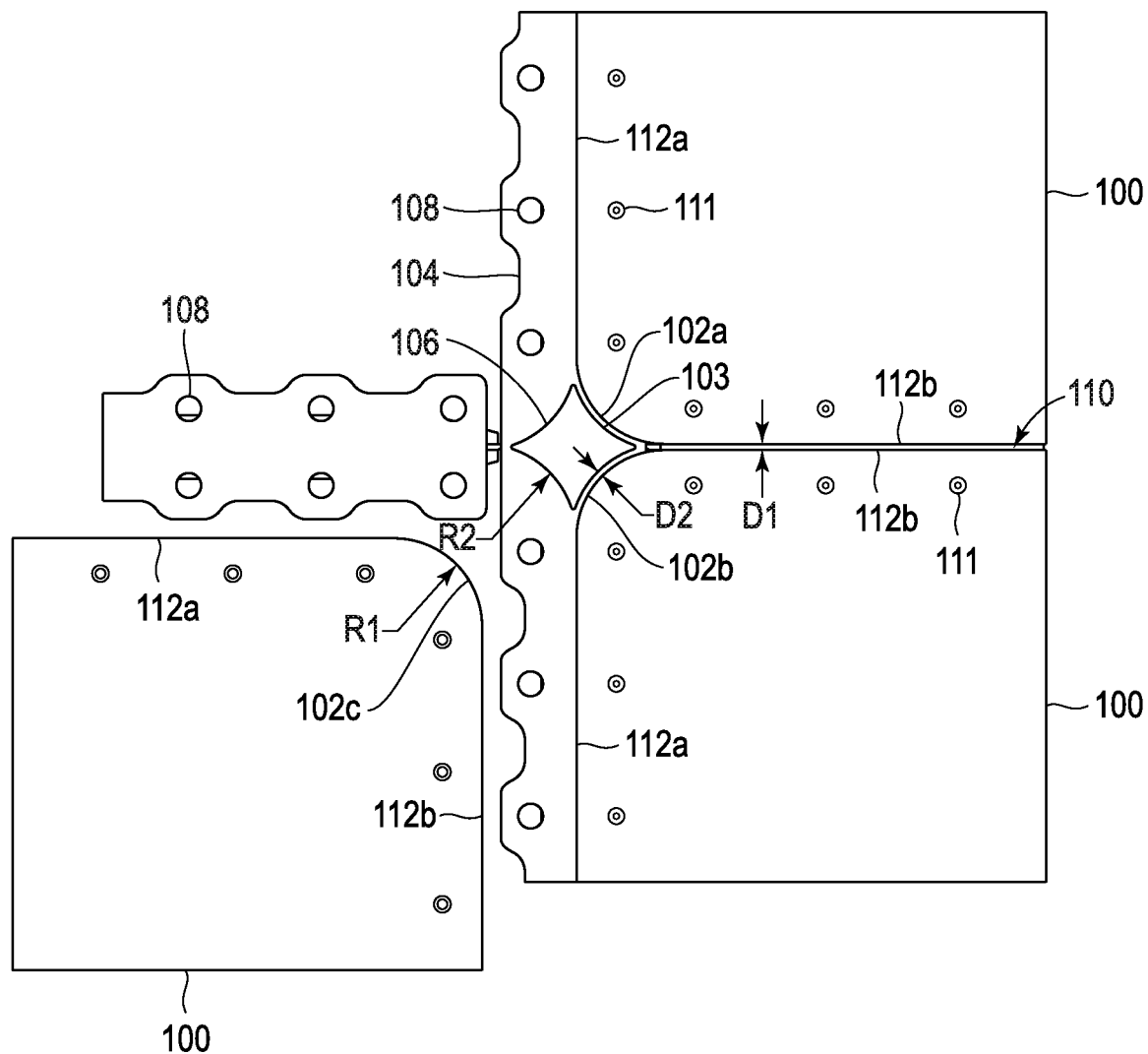

FIG. 4 illustrates a top plan view of the vehicle panels of FIG. 1 with panels removed.

Figure 5:
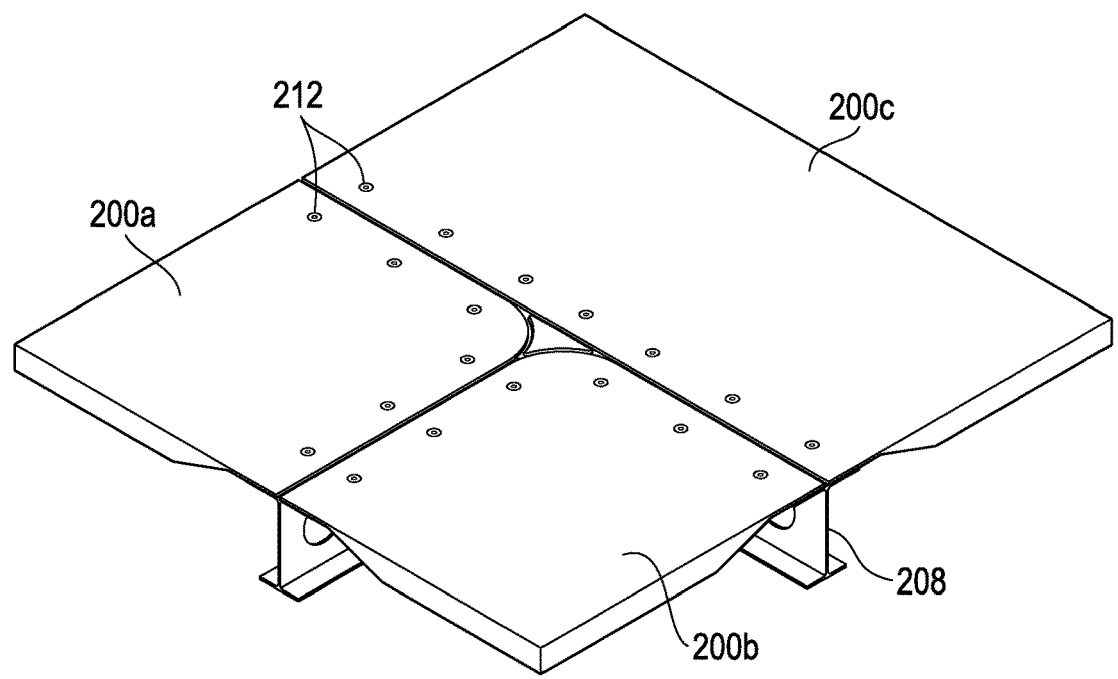

FIG. 5 illustrates a top perspective view of vehicle panels in accordance with another embodiment.

Figure 6:
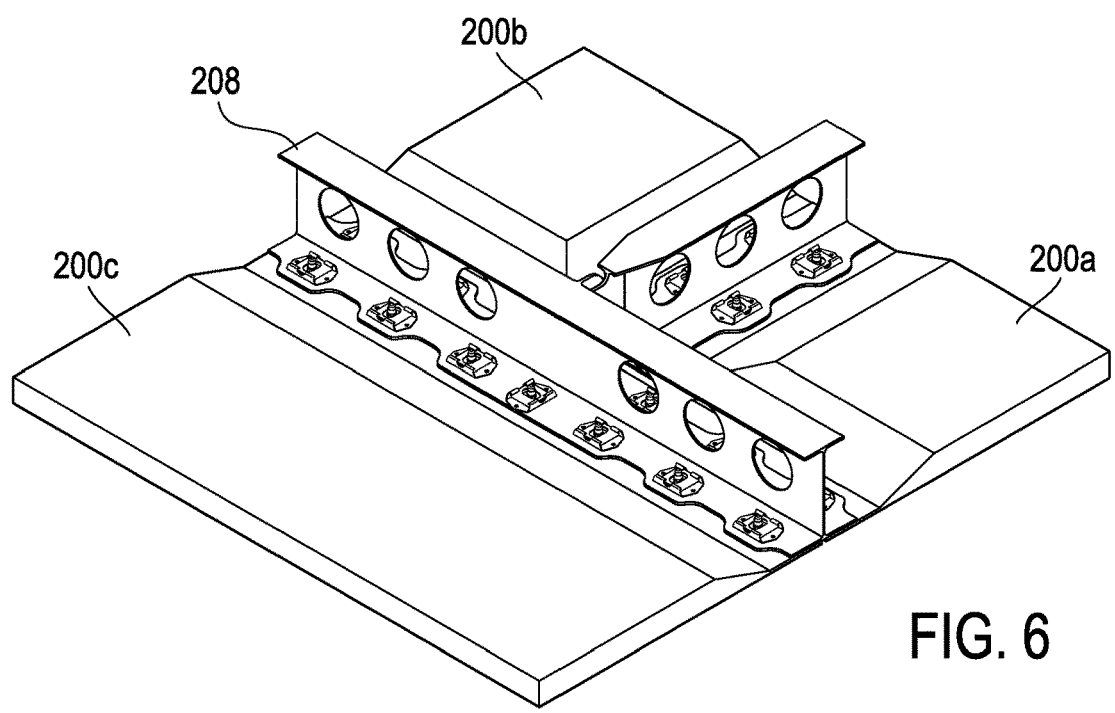

FIG. 6 illustrates a bottom perspective view of the vehicle panels of FIG. 5.

Figure 7:
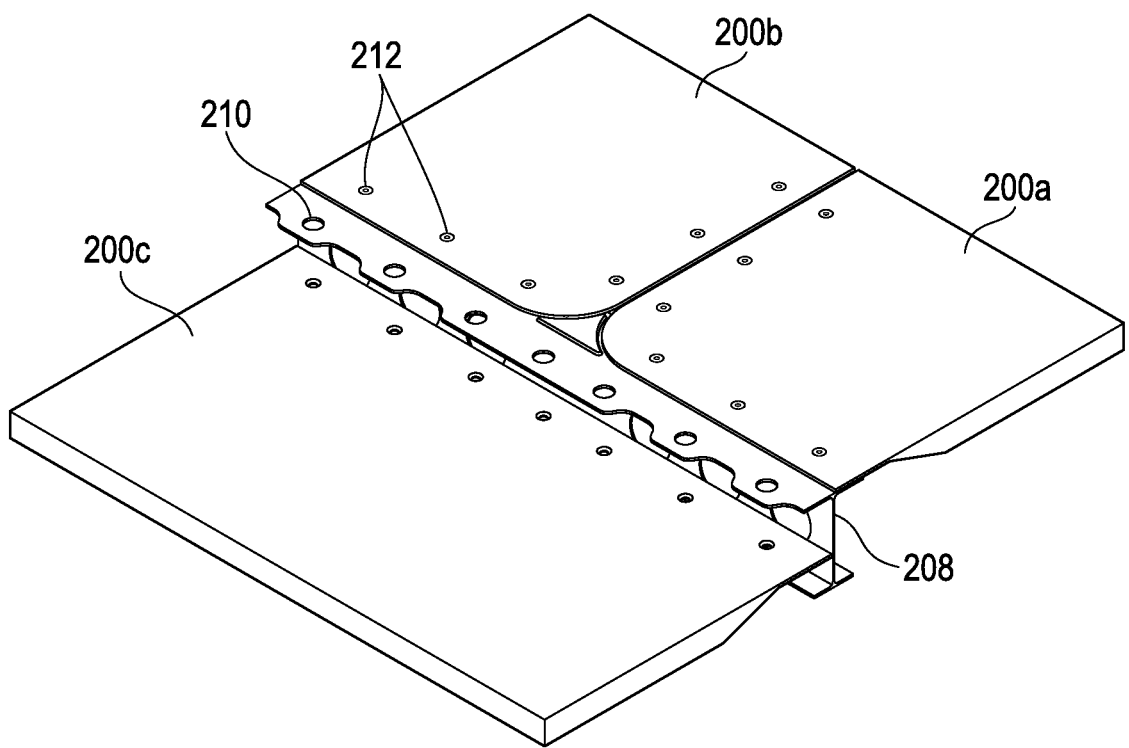

FIG. 7 illustrates a top perspective view of the vehicle panels of FIG. 5 with panels removed.

Figure 8:
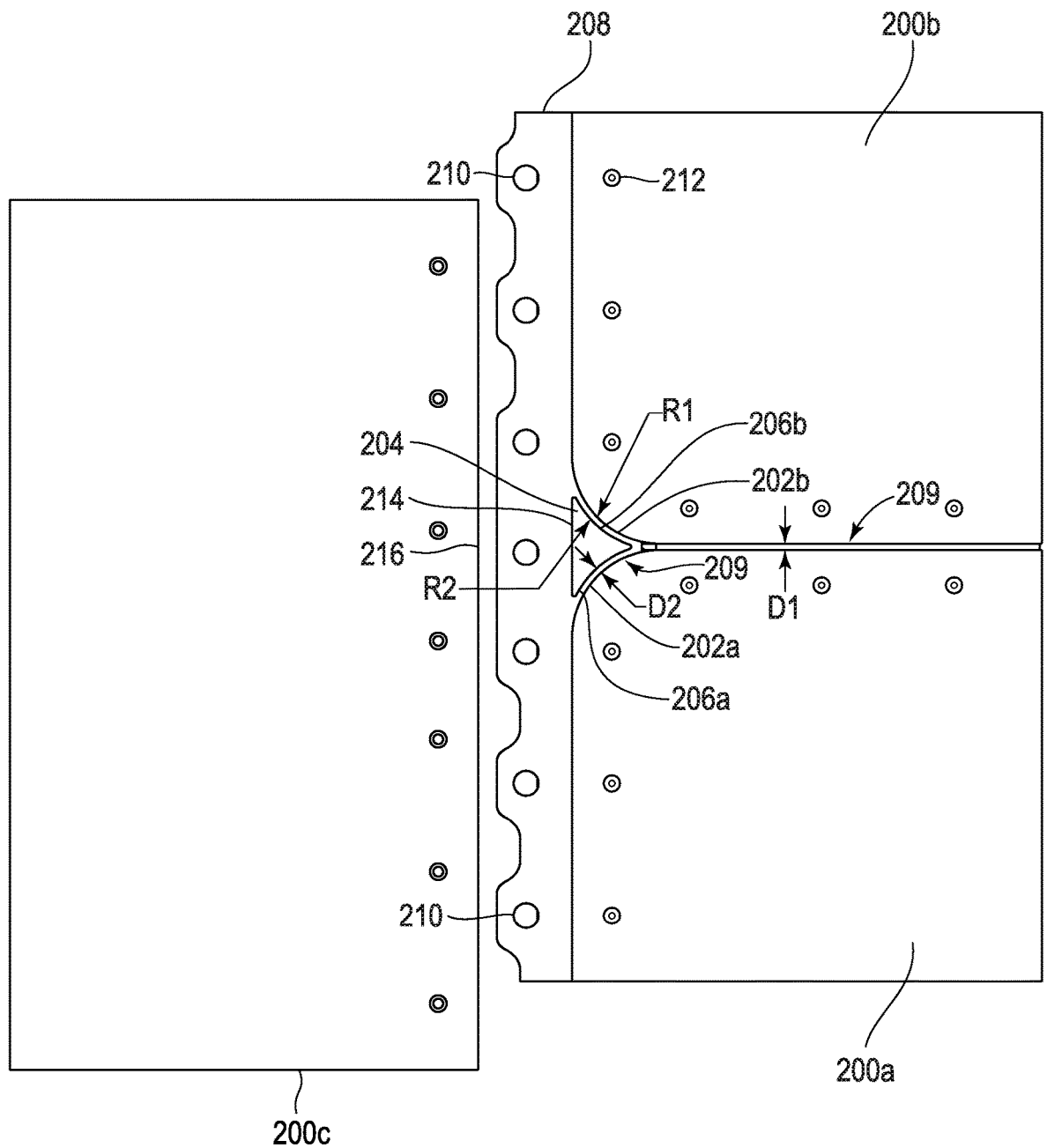

FIG. 8 illustrates a top plan view of the vehicle panels of FIG. 5 with panels removed.

Figure 9:
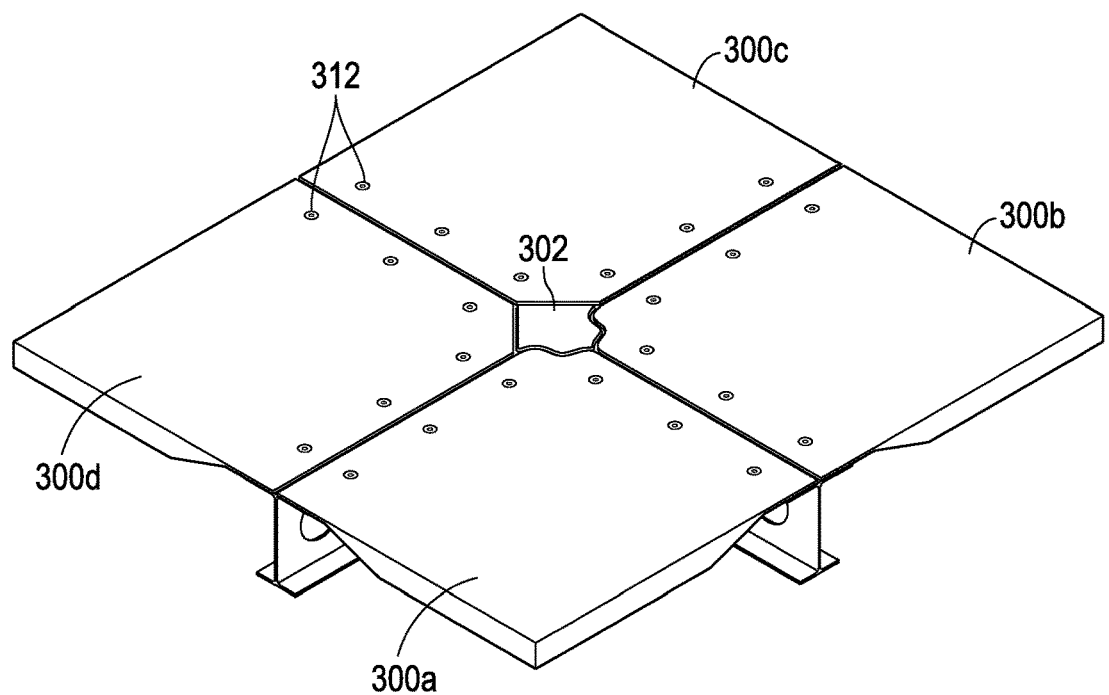

FIG. 9 illustrates a top perspective view of vehicle panels in accordance with another embodiment.

Figure 10:
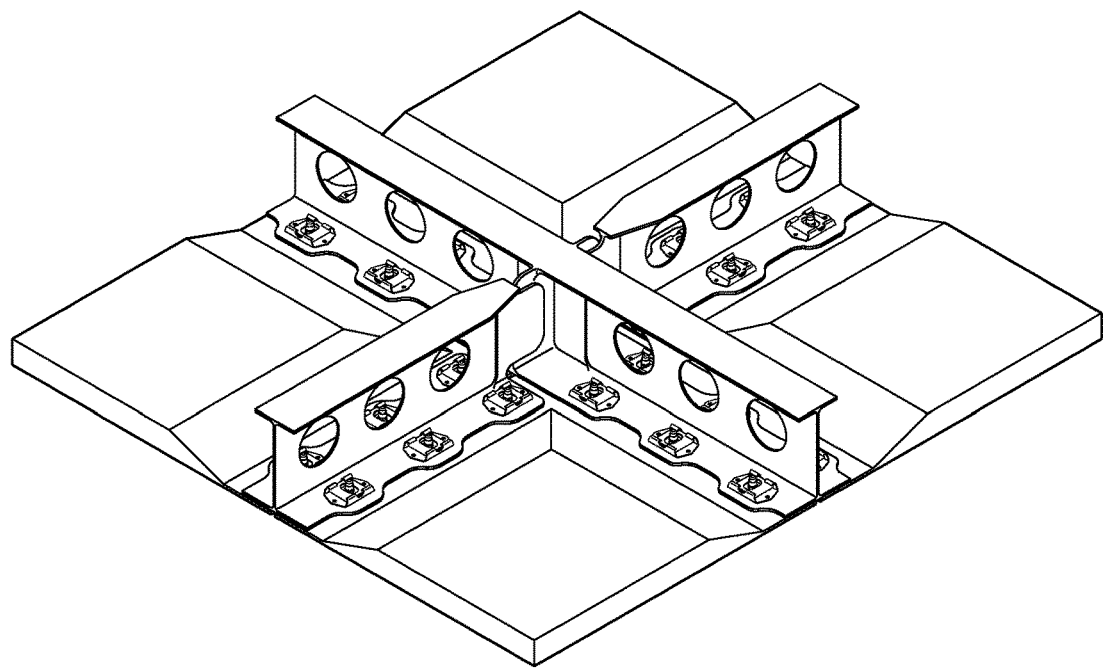

FIG. 10 illustrates a bottom perspective view of the vehicle panels of FIG. 9.

Figure 11:
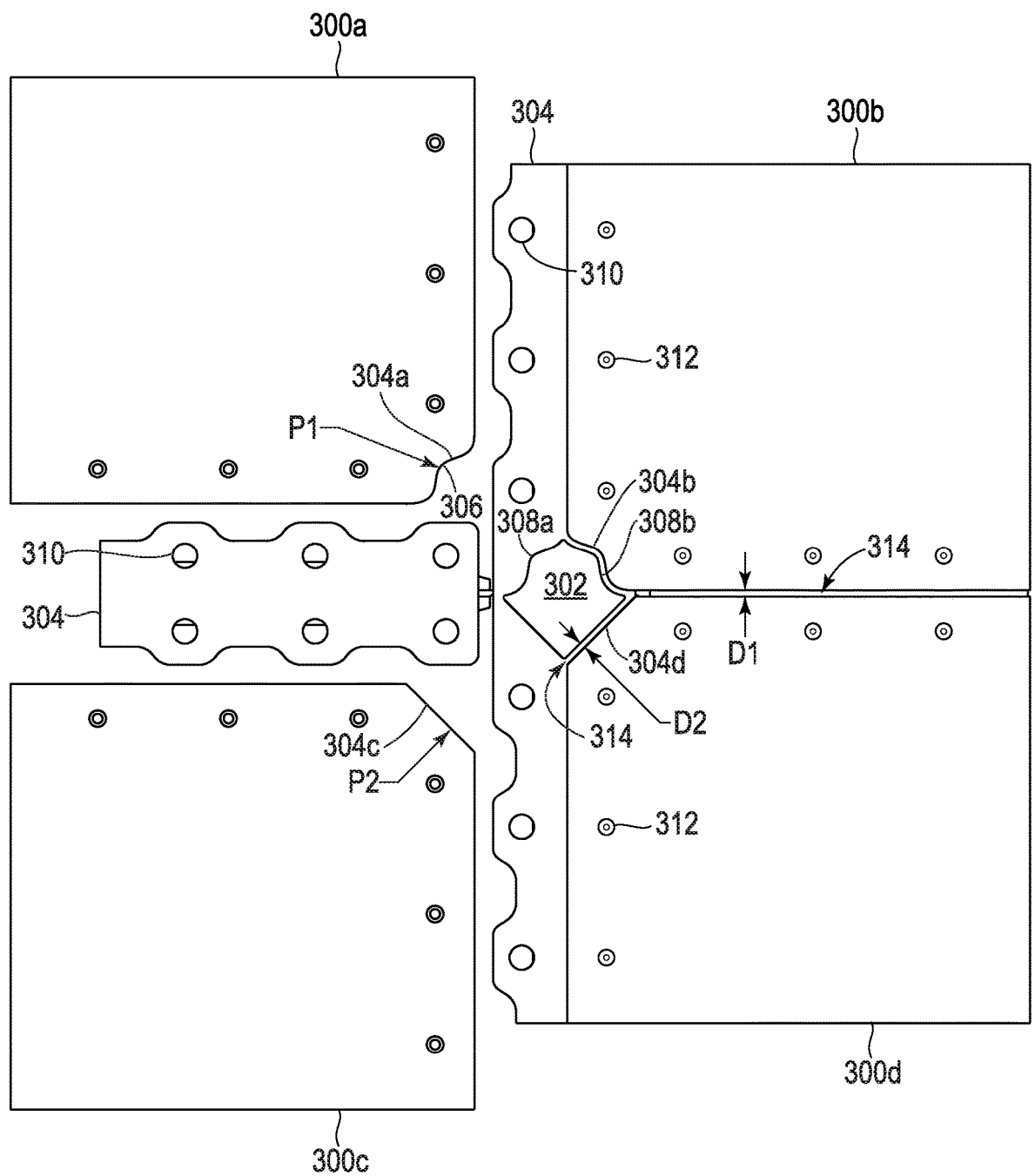

FIG. 11 illustrates a top plan view of the vehicle panels of FIG. 9 with panels removed.

Figure 12:
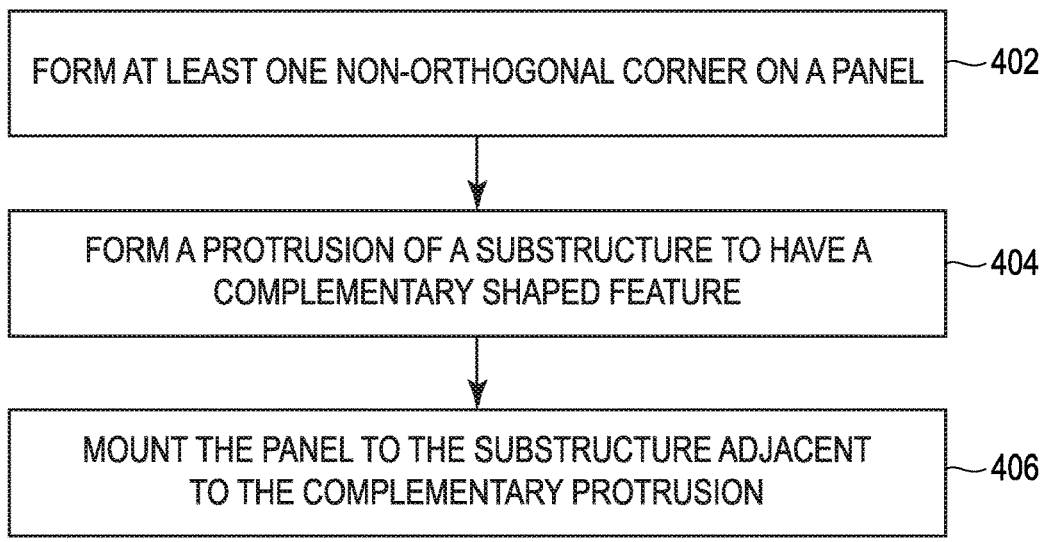

FIG. 12 is a block diagram of a method for manufacturing a vehicle panel in accordance with various embodiments.

Figure 13:
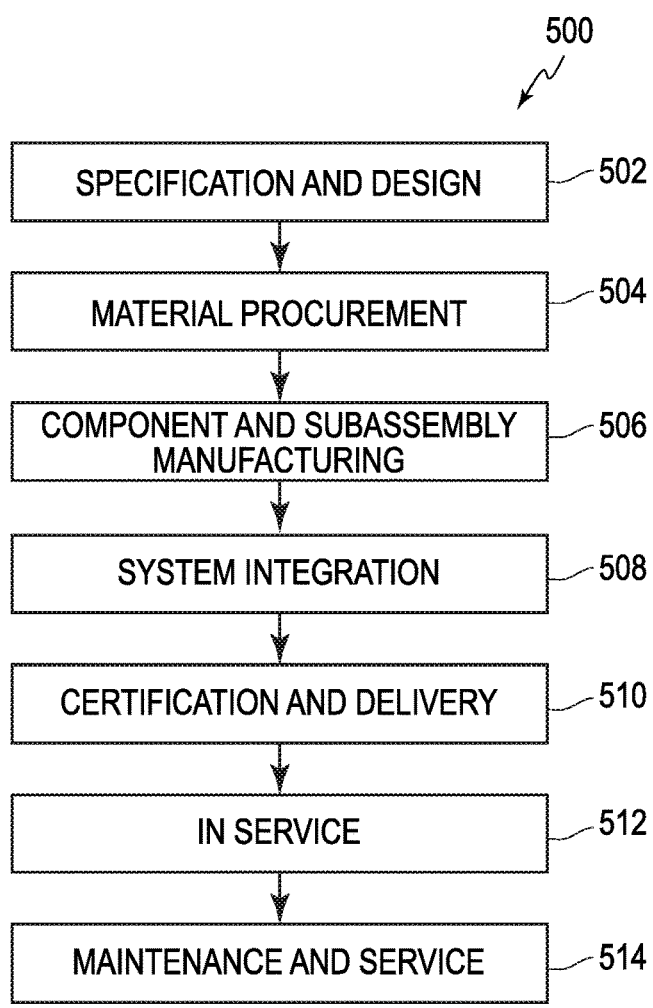

FIG. 13 is a block diagram of an aircraft production and service methodology.

Figure 14:
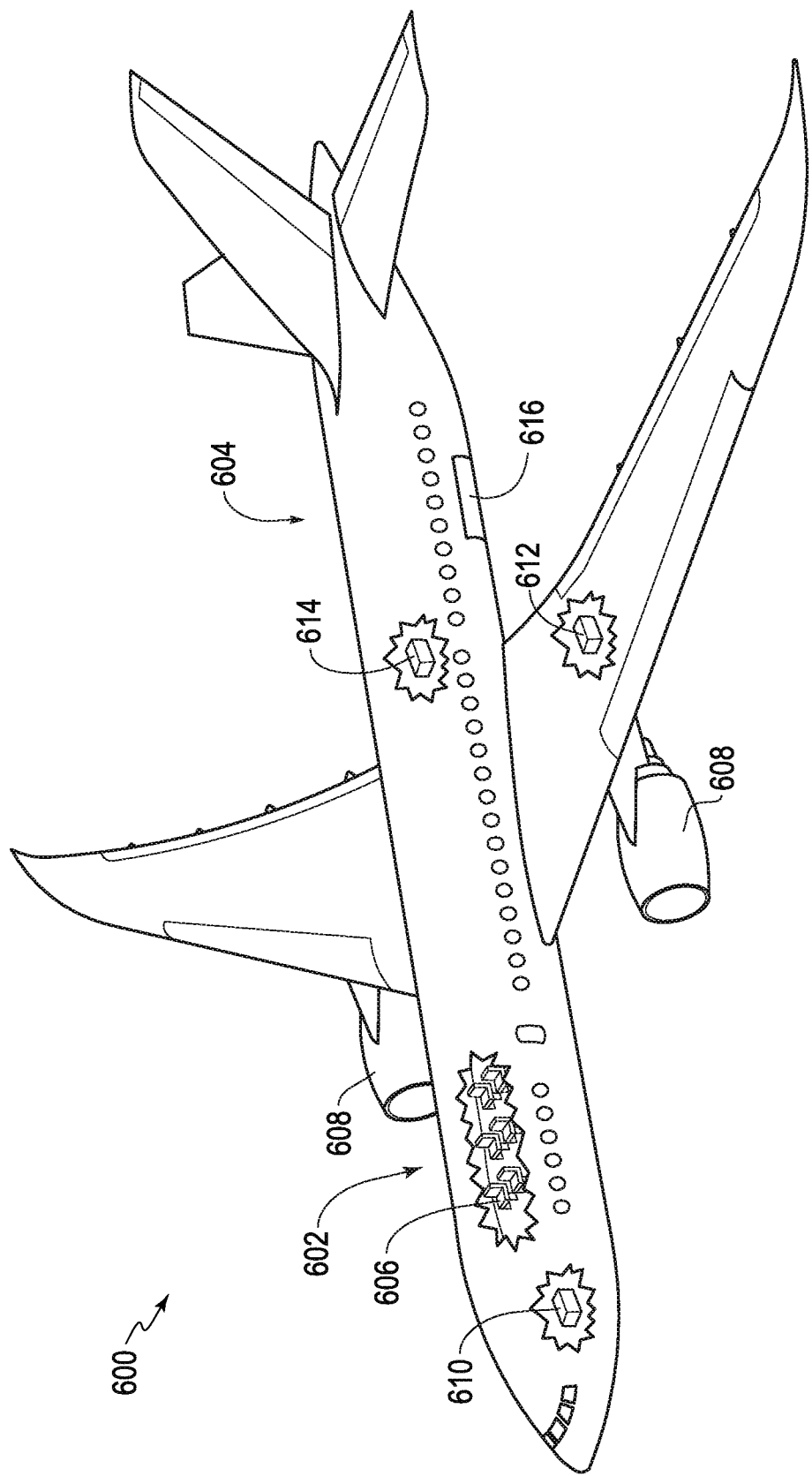

FIG. 14 is a schematic perspective view of an aircraft.

DETAILED DESCRIPTION

The following detailed description of certain embodiments will be better understood when read in conjunction with the appended drawings. To the extent that the figures illustrate diagrams of different components of various embodiments, the components are not necessarily indicative of the division between hardware implementations. Thus, for example, one or more of the components may be implemented in a single piece of hardware or multiple pieces of hardware. It should be understood that the various embodiments are not limited to the arrangements and instrumentality shown in the drawings.

Various embodiments provide a panel for a vehicle, also referred to as a skin panel. The skin panel has one or more non-orthogonal corners, such as a curved edge and a substructure that has a protrusion that compensates or accommodates for the negative space (gap/void) created between adjacent skin panels by the one or more non-orthogonal corners. For example, some embodiments include panels for vehicles, particularly aircraft exterior panels and methods of manufacturing the exterior panels that have a reduced likelihood of damage to the corners of the exterior panels. In various embodiments, the non-orthogonal (e.g., curved) corner is formed from a large radius at one or more corners of the aircraft exterior panel to eliminate sharp corners on aircraft exterior panels, along with a corresponding feature on the attaching substructure to maintain the aerodynamic surface. The resulting panel design is less susceptible to corner damage when the panel is not attached to the substructure. In some embodiments, the feature on the substructure is added to maintain the exterior aerodynamic surface (providing a smooth exterior surface), thereby increasing the size of the rounded feature on the panel relative to solutions that do not have such a feature on the substructure. Additionally, the non-orthogonal corner "keys" the panel such that the panel only fits in a specific location on the vehicle. More particularly, when mounted, this configuration orients the panels in a defined configuration and/or location on the vehicle.

By practicing one or more embodiments, elimination of the sharp corner of the aircraft exterior panel with a rounded feature reduces the likelihood of damage. Additionally, as the radius of the feature increases, the potential for damage further decreases. Additionally, the keyed configuration reduces the amount of time needed to install the panel.

In one embodiment, as illustrated in FIGS. 1-4 where plural panels 100 come together, for example where four panels come together at respective corners 102a-d, a radius is provided on the corners 102a-d of the panels 100, such as a large radius that defines a smooth curved corner region. In the negative spaces where panel material does not exist, thereby forming the smooth corner (e.g., rounded corner), the substructure design contains a feature with a geometry selected to maintain the aerodynamic surface as discussed in more detail herein.

In FIGS. 1-4, the panels 100 are configured as skin panels (e.g., aircraft skin panels), each having an edge at respective corners 102a-d that does not form a right angle and a substructure 104 that supports the panels 100. For example, in some embodiments, the substructure 104 has a protrusion 106 that has a shape (e.g., curved edge profile) that complements the edges of the corners 102a-d (e.g., having a complementary curvature) so that the protrusion 106 fills at least a portion of one or more voids created by the corners 102a-d of the panels 100. Both the protrusion 106 and the panels 100 are configured to fit together to form a substantially planar outer surface of a vehicle (e.g., a substantially smooth outer aircraft fuselage).

The substructure 104 in various embodiments is a frame or supporting structure for a portion of the vehicle. In FIGS. 1-4, the substructure 104 is a frame (defining one or more cross-members) having openings 108 (shown in FIG. 3 and FIG. 4) used to mount the panels 100 to the substructure 104, such as with screws 111. However, any fastening or mounting arrangement may be used, such as, for example, rivets. The substructure 104 may also take any configuration and is generally formed based on the mounting requirements of the panels 100 (i.e., to provide a support structure for secure mounting of the panels 100 thereto). In various embodiments, the substructure 104 defines a stiffener or frame onto which the panels 100 are mounted. For example, in some embodiments, the substructure 104 defines a stiffener that is a fuselage frame for an aircraft.

As illustrated particularly in FIG. 4, the radii (R1) of the panels 100 and the radii (R2) of the curvature on the feature on the substructure (illustrated as a complementary curved surface on the protrusion 106) are selected such that the distance (D2) between the panels 100 and the substructure's feature is maintained at a distance that is the same as the distance (D1) that exists between adjacent panels 100 (or substantially the same distance within an acceptable tolerance). The distance (D1) and the distance (D2) form a gap 110 between the panels 100 and between the panels 100 and the protrusion 106. The gap 110 is uniform in that the distance (D1) is substantially the same as the distance (D2). As such, the distance (D1) and distance (D2) represent a gap width (W). This gap 110 defines an aerodynamic feature or property to reduce or minimize drag, while accommodating any possible relative motion between panels 100 or the panel 100 and the substructure 104 and protrusion 106.

Thus, the spacing between different components in the final assembled panel structure is the same in the illustrated embodiment. In the embodiment of FIGS. 1-4, the panels 100 are structural panels configured for assembly to a vehicle, which is an aircraft. In the illustrated embodiment, the panels 100 define a skin panels having a body that is a substantially rectangular shape (illustrated as generally square and having the same size) with two adjacent sides 112a and 112b that are orthogonal to one another and orthogonal to a surface of the panel 100. The sides 112a and 112b intersect at the corners 102a-d, wherein the corners 102a-d have a profile 107 that is substantially non-orthogonal (illustrated as arcuately curved). Thus, the corners 102a-d of the panels 100 align at a center region between the panels 100. It should be noted that the panels 100 may be sized and shaped differently (e.g., non-rectangular) and the corners 102a-d may be formed to have different shaped profiles that are smoothly contoured or not smoothly contoured.

Accordingly, the substructure 104 defines a support member, illustrated as an elongated stiffener, to which the panels 100 are secured. In various embodiments, the substructure 104 forming the stiffener includes a protrusion 106 that defines a protruding portion extending from a body 105 of the substructure 104 towards the surface of the panels 100 (upward or outward as viewed in FIGS. 1-4). Because the protrusion 106 has a profile extending along an edge thereof that substantially matches the profile of the corners 102a-d of the panels, the protrusion 106 and the corners 102a-d of the panels 100 form the gap 110 therebetween having a substantially uniform gap width (W), defined by the distances D1 and D2. That is, as described herein, the shape of the edge surface of the corners 102a-d of the panels 100 are formed to be complementary to the shape of the edge surface 103 of the protrusion 106 to be mounted in an adjacent alignment to have the defined gap 110 therebetween, which in various embodiments has a uniform gap width. The gap 110 width may be defined based on required or desired tolerances for movement of the panels during operation of the vehicle (e.g., during aircraft flight).

Thus, in the illustrated embodiment, the panels 100 each have one corner 102a-d, wherein the profile of the corner 102a-d and the profile of the protrusion 106 are rounded, with each having a non-zero radius of curvature. It should be noted that the other corners of the panels 100 in the illustrated embodiment do not have the rounded edges, but instead have squared, orthogonal or 90 degree corners (which may be slightly smoothed to dull the sharp point of the corner). In other embodiments, one or more of the other corners on one or more the panels 100 may define a non-orthogonal corner, such as a rounded corner similar to the corners 102a-d (or may have a different shaped profile).

In FIGS. 1-4, the complementary edges of the panels 100 and the protrusion 106 at the corners 102a-d have a smooth arcuate curvature. In one embodiment, the radius of curvature of the profile of the corner 102a-d is approximately 2.0 inches and the radius of curvature of the profile of the protrusion 106 is approximately 2.14 inches. However, the radius of curvature may be varied as desired or needed and may have different relative curvatures. Additionally, the radius of curvature may be the same for the corners 102a-d of the panels 100 and the protrusion 106 or the radius of curvature of the corners 102a-d may be greater than the radius of curvature of the protrusion 106.

The width of the gap 110 also may vary as desired or needed. In one embodiment, the gap width is approximately 0.14 inches. In other embodiments, the width (W) of the gap 110 is greater or smaller, such as based on tolerances for relative movement between the panels 100. Additionally, in some embodiments, the width (W) of the gap 110 between different pairs of panels 100 may be different and/or may vary in width between two panels 100.

Thus, in various embodiments, each panel 100 is a skin panel having a first corner shape profile (illustrated at the corners 102a-d), the profile of the protrusion 106 at each of these corners 102a-d has a shape complementary to the first corner shape profile. For example, the edges of the protrusion 106 define a first edge, and the protrusion 106 includes a second profile along second edges that will be positioned adjacent to the first edges, wherein the second profile substantially matches a profile of the corners 102a-d of the panels 100. Thus, a complementary profile arrangement is provided to maintain required or desired exterior aerodynamic properties, such as aerodynamics during aircraft flight.

In various embodiments, the protrusion 106 has a height (H1) substantially the same as a height (H2) of the surface of the panels 100, such that panels 100 form a substantially planar surface in an area encompassing the protrusion 106. For example, a surface across multiple panels 100 and the protrusion 106 is generally aerodynamically smooth. In some embodiments, the protrusion 106 is integrally formed with the substructure 104 (e.g., stiffener). In other embodiments, the protrusion 106 is attached to the substructure 104.

It should be noted that the various components may be formed from one or more different materials. In some embodiments, multiple components are formed from the same or different materials. In one embodiment, the skin panel is made of a composite material.

It also should be noted that in some embodiments, the panels 100 are manufactured for use in initial assembly of an aircraft (e.g., sized and configured to form an aircraft fuselage outer body). However, in some embodiments, the panels 100 are configured as aftermarket panels and that may be used, for example, for repairs or replacements.

Variations and modifications are contemplated by the present disclosure. For example, the smooth edge feature of various embodiments is not limited to a four panel assembly configuration, but may be implemented in arrangements having more or less panels that meet in different configurations. For example, as illustrated in FIGS. 5-8, a configuration is shown having a three panel 200a-c arrangement, wherein corners 202a and 202b of two panels 200a and 200b have a shaped profile complementary to a portion of a protrusion 204, namely to the two sides 206a and 206b. Similar to the embodiment shown in FIGS. 1-4, the corners 202a and 202b and the sides 206a and 206b are curved (or arcuately shaped) in a complementary manner to define a gap 209 having a width that is substantially the same to the width of the gap 209 between panels 200. Thus, the corners 202a and 202b and the protrusion 204 are configured similar to the corners 102a-d and protrusion 106 of FIGS. 1-4.

Additionally, in the configuration of FIGS. 5-8, similar to the configuration in FIGS. 1-4, a substructure 208 forms a frame (defining one or more cross-members) having openings 210 used to mount the panels 200 to the substructure 208, such as with screws 212. The substructure 208 is configured similar to the substructure 104, but may have a different configuration as desired or needed (and as described herein).

In the configuration of FIGS. 5-8, unlike the configuration illustrated in FIGS. 1-4, only the corners 202a and 202b have the curved feature. The other side of the protrusion 204 in this embodiment is a straight edge 214. In this configuration, the panel 200c extends opposite to both of the panels 200a and 200b, such that no corner of the panel 200c is present where the corners 202a and 202b are located. Accordingly, when the panel 200c is mounted to the substructure 208, the straight edge 214 of the protrusion 204 is positioned adjacent to a straight edge 216 of the panel 200c, such that the gap 209 is provided therebetween. Thus, in this embodiment, the corners 202a and 202b meet adjacent to the straight edge 216 of the panel 200c.

Additional modifications and variations are contemplated. For example, the profile geometry of one or more of the corners does not have to be a constant radius (illustrated in FIGS. 9-11). As shown in FIGS. 9-11, similar to FIGS. 1-4, the panel arrangement includes four panels 300a-d that meet at a protrusion 302 of a substructure 304. However, in this embodiment, different corners of the protrusion 302 and corresponding corners of the panels 300a-d have different shaped features.

More particularly, the corners 304a and 304b of the panels 300a and 300b include a profile geometry having a non-uniform curvature (P1). In the illustrated embodiment, the corners 304a and 304b have a concave portion 306 defining a valley of a wave-like shaped profile (such as an s-shaped profile having ends that join the two adjacent sides). The concave portion 306 may be positioned at a middle of the corners 304a and 304b or offset from the middle of the corners 304a and 304b. The edges 308a and 308b of the protrusion 302 having a complementary shape having an opposing convex portion defining a "hump".

Additionally, the corners 304c and 304d of the panels 300c and 300d include a profile geometry having straight linear (P2) segments. It should be noted that when increasing the number of corner angles, the angle also may be increased so as to further reduce or minimize susceptibility to damage. Thus, in this embodiment, the panels 300c and 300d have corners 304c and 304d with a diagonal profile having ends that linearly join the two adjacent sides.

Thus, the corners 304a-d may define one or more (or one or more pairs) of corners having a first profile and a second profile such that each panel 300a-d is "keyed" using the corners 304a-d. The "keyed" configuration, for example in an aircraft assembly, provides panels that only fit in a specific location on the airframe. More particularly, when mounted, this configuration orients the panels in a defined configuration and/or location.

Additionally, in the configuration of FIGS. 9-11, similar to the configuration in FIGS. 1-4, the substructure 304 forms a frame (defining one or more cross-members) having openings 310 used to mount the panels 300 to the substructure 304, such as with screws 312. The substructure 304 is configured similar to the substructure 104, but may have a different configuration as desired or needed (and as described herein). Similar to the other embodiments, a gap 314 having a uniform width (D1 and D2) is provided between the panels 300 and between the corners 304a-d of the panels 300 and the protrusion 302.

Thus, various embodiments provide one or more panels having non-orthogonal corners that are configured to reduce the likelihood of damage to the corners. The corners are formed to be rounded, smoothed or otherwise shaped in a manner that is more than simply blunting or buffing of the corners. That is, a buffing process may take off 0.01-0.02 inches (or 1 mm-2 mm) to reduce the sharpness of the corners. In contrast, in various embodiments, the corners are formed (e.g., during manufacture of the panels) to have a large radius in contrast to being buffed after manufacture to include a small radius. For example, one or more of the corners of the panels are formed (during manufacture) to have a large curvature of radius (e.g., 0.1-0.2 inches) that is complementary to a curvature on a protrusion of a substructure to which the panels are mounted.

A method 400 for manufacturing panels is illustrated in FIG. 12. It should be appreciated that the method 400 may be implemented by one or more of the embodiments disclosed herein, which may be combined or modified as desired or needed. Additionally, the steps in the method 400 may be modified, changed in order, performed differently, performed sequentially, concurrently or simultaneously, or otherwise modified as desired or needed.

The method 400 includes forming at least one non-orthogonal corner on a panel at 402, such as a skin panel for an aircraft as described herein. The non-orthogonal corner is formed as part of the manufacturing process for the panel in various embodiments. That is, in various embodiments, the mold for forming the panels includes the at least one non-orthogonal corner, such that the panel is manufactured with one or more curved corners as described herein. However, in other embodiments, the corners may be formed after the panel is manufactured.

The method 400 includes forming a protrusion of a substructure to have a complementary shaped feature at 404. For example, as described herein, the substructure may be the frame of an aircraft fuselage and the protrusion is a protruding portion that fills the negative space of the non-orthogonal corner when mounted to the substructure. It should be noted that the complementary shaped feature of the protrusion is configured such that a uniform gap is provided between the protrusion and the panel that generally matches the gap between adjacent panels.

The method 400 also includes mounting the panel to the substructure adjacent to the complementary protrusion at 406. As described herein, when mounted on the substructure, the panel and protrusion define a generally planar surface, such as across the outside surface of the aircraft fuselage. In some embodiments, the panel and feature on the substructure define a "keyed" arrangement.

The disclosure and drawing figure(s) describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, in some aspects of the disclosure, not all operations described herein need be performed.

Examples of the disclosure may be described in the context of an aircraft manufacturing and service method 500 as shown in FIG. 13 and an aircraft 600 as shown in FIG. 14. During pre-production, illustrative method 500 may include specification and design 502 of the aircraft 600 and material procurement 504. During production, component and subassembly manufacturing 506 and system integration 508 of the aircraft 600 take place. Thereafter, the aircraft 600 may go through certification and delivery 510 to be placed in service 512. While in service by a customer, the aircraft 600 is scheduled for routine maintenance and service 514 (which may also include modification, reconfiguration, refurbishment, and so on).

Each of the processes of the illustrative method 500 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown FIG. 14, the aircraft 600 produced by the illustrative method 500 may include an airframe 602 with a plurality of high-level systems 604 and an interior 606. Examples of high-level systems 604 include one or more of a propulsion system 608, an electrical system 610, a hydraulic system 612, and an environmental system 614. Any number of other systems may be included. Although an aerospace example is shown, the principles may be applied to other industries, such as the automotive industry.

Apparatus and methods shown or described herein may be employed during any one or more of the stages of the manufacturing and service method 500. For example, components or subassemblies corresponding to component and subassembly manufacturing 506 may be fabricated or manufactured in a manner similar to components or subassemblies produced while the aircraft 600 is in service. Also, one or more aspects of the apparatus, method, or combination thereof may be utilized during the production states 506 and 508, for example, by substantially expediting assembly of or reducing the cost of an aircraft 600. Similarly, one or more aspects of the apparatus or method realizations, or a combination thereof, may be utilized, for example and without limitation, while the aircraft 600 is in service, e.g., maintenance and service 514. For example, in some embodiments, the method 500 may include accessing a cargo door 616 into a cargo area that includes cargo rollers that may be covered by one or more embodiments.

Different examples and aspects of the apparatus and methods are disclosed herein that include a variety of components, features, and functionality. It should be understood that the various examples and aspects of the apparatus and methods disclosed herein may include any of the components, features, and functionality of any of the other examples and aspects of the apparatus and methods disclosed herein in any combination, and all of such possibilities are intended to be within the spirit and scope of the present disclosure.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from their scope. While the dimensions and types of materials described herein are intended to define the parameters of the various embodiments, the embodiments are by no means limiting and are exemplary embodiments. Many other embodiments will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112, paragraph (f), unless and until such claim limitations expressly use the phrase "means for" followed by a statement of function void of further structure.

This written description uses examples to disclose the various embodiments, including the best mode, and also to enable any person skilled in the art to practice the various embodiments, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed is:

1. A panel arrangement for a vehicle, the panel arrangement comprising:
   a panel comprising a first surface, a first edge of the first surface adjacent to a second edge of the first surface, the first edge and the second edge joined by a corner having a profile that is curved;
   a substructure comprising a protrusion, the protrusion comprising a second surface, wherein a profile along an edge of the second surface substantially matches the profile of the corner of the panel such that the second surface and the first surface form a gap therebetween; and
   a plurality of fasteners, wherein a first subset of the plurality of fasteners couple the panel to the substructure along the first edge, wherein a second subset of the plurality of fasteners couple the panel to the substructure along the second edge, and wherein the protrusion is distinct from the plurality of fasteners.

2. The panel arrangement of claim 1, further comprising a plurality of panels, wherein each panel of the plurality of panels comprises a curved corner on a corresponding first surface, wherein the second surface substantially matches each of the corresponding first surfaces such that the second surface and each of the corresponding surfaces form a corresponding gap with a width substantially similar to a width of the gap.

3. The panel arrangement of claim 1, wherein the first edge and the second edge are orthogonal to one another and the first surface further comprises a third edge orthogonal to the first edge and a fourth edge orthogonal to the second edge and to the third edge.

4. The panel arrangement of claim 1, wherein the substructure comprises a plurality of elongated stiffeners, and wherein the panel is coupled to a first elongated stiffener of the plurality of elongated stiffeners and a second elongated stiffener of the plurality of elongated stiffeners.

5. The panel arrangement of claim 1, wherein a radius of curvature of the profile of the corner is approximately 2.0 inches and a radius of curvature of the profile of the protrusion is approximately 2.14 inches.

6. The panel arrangement of claim 1, wherein the panel and the protrusion form an aerodynamically smooth surface.

7. The panel arrangement of claim 1, wherein the profile of a second corner of the first surface is one of an angled, a wave-shaped or an s-shaped profile.

8. The panel arrangement of claim 1, wherein the gap has a width that is approximately 0.14 inches.

9. The panel arrangement of claim 1, wherein the panel is a first skin panel, the profile of the protrusion is a first profile, the edge of the protrusion is a first edge, and the protrusion further comprises a second profile along a second edge, wherein the second profile substantially matches a profile of a corner of a second skin panel.

10. The panel arrangement of claim 9, wherein the first profile and the second profile are different from one another to orient the first and second skin panels.

11. The panel arrangement of claim 1, wherein the protrusion has a height relative to a particular surface of the substructure substantially the same as a height of the panel relative to the particular surface of the substructure.

12. The panel of claim 1, wherein the protrusion is integrally formed with the substructure.

13. The panel arrangement of claim 1, wherein the protrusion is attached to the substructure.

14. The panel arrangement of claim 1, wherein the substructure comprises a frame of an aircraft fuselage.

15. The panel arrangement of claim 1, wherein the panel is formed of a composite material.

16. A skin panel comprising:
   a body comprising a first surface having a first edge of the first surface adjacent to a second edge of the first surface, the first edge and the second edge joined by a corner having a profile that is curved and that is shaped complementary to a portion of a substructure to which the body is to be mounted, wherein the body is configured to receive a plurality of fasteners via a plurality of openings, wherein the body is configured to be coupled to the substructure via the plurality of fasteners, wherein a first subset of the plurality of openings couples to the substructure along the first edge, wherein a second subset of the plurality of openings couples to the substructure the second edge, and wherein the portion is distinct from the plurality of fasteners.

17. The skin panel of claim 16, wherein the corner is one of wave-shaped or s-shaped.

18. The skin panel of claim 16, wherein the body has at least two corners that have differently shaped profiles to define a mounting orientation when mounted to the substructure.

19. The skin panel of claim 16, wherein the body is formed of a composite material.

20. A method of manufacturing a panel for a vehicle, the method comprising:
   forming a rounded corner on a panel with a first surface having a first edge and a second edge during a manufacturing process of the panel; and
   configuring the panel for mounting to a substructure of a vehicle having a protrusion with a complementary feature to the rounded corner, such that the rounded corner is positioned adjacent to the complementary feature to define a gap therebetween, wherein the panel is configured to receive a plurality of fasteners via a plurality of openings, wherein the panel is configured to be coupled to the substructure via the plurality of fasteners, wherein a first subset of the plurality of openings couples to the substructure along the first edge, wherein a second subset of the plurality of openings couples to the substructure along the second edge, and wherein the protrusion is distinct from the plurality of fasteners.

* * * * *